United States Patent Office 3,551,053
Patented Dec. 29, 1970

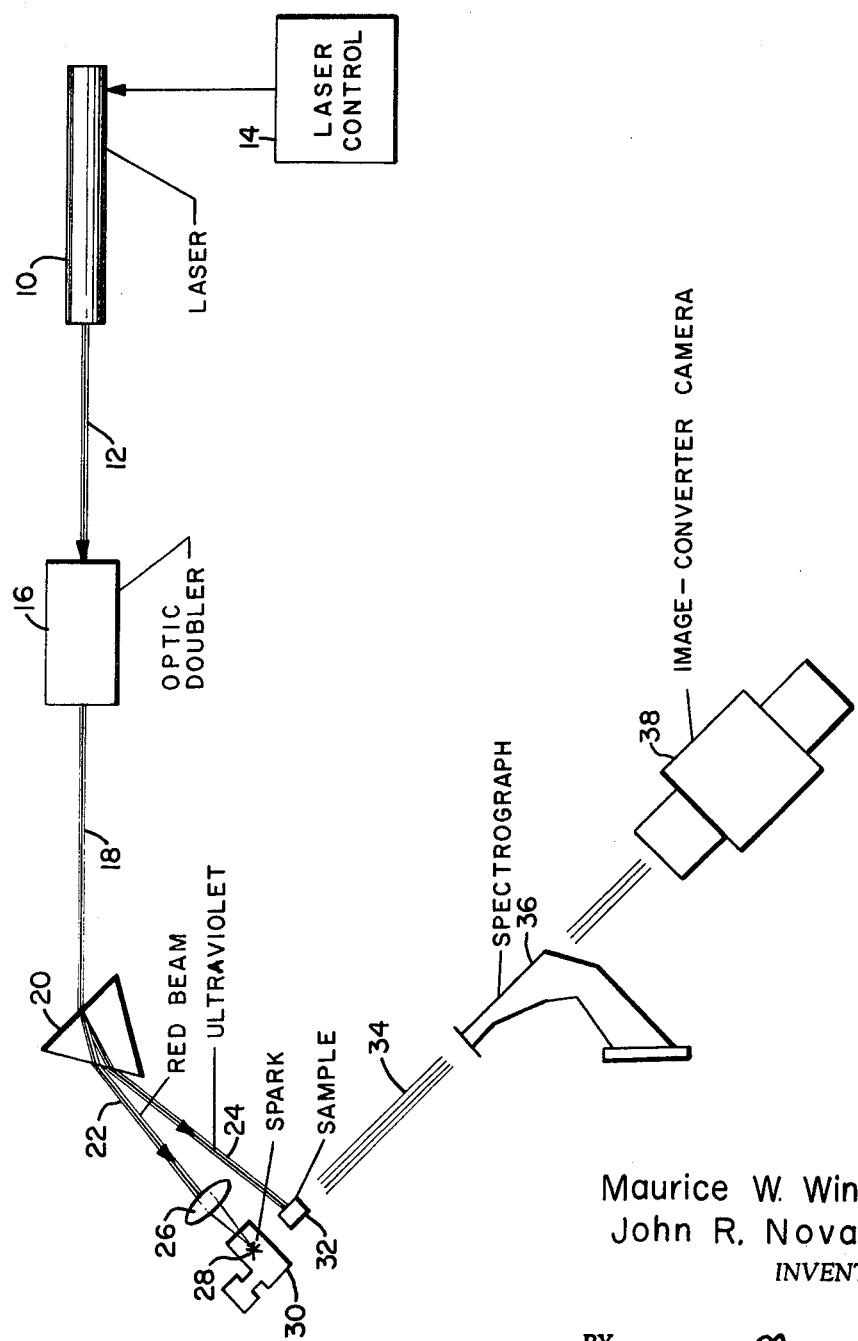

3,551,053
LASER PHOTOLYSIS AND SPECTROSCOPY SYSTEM
Maurice W. Windsor, Redondo Beach, and John Richard Novak, Canoga Park, Calif., assignors to TRW Inc., Redondo Beach, Calif., a corporation of Ohio
Filed Oct. 14, 1968, Ser. No. 767,363
Int. Cl. G01j 3/42
U.S. Cl. 356—85          10 Claims

ABSTRACT OF THE DISCLOSURE

The specification discloses an example of novel laser and frequency doubling apparatus which provides a spatially separated pair of synchronized beams, one red and one ultraviolet. The system of the example disclosed further includes means for holding a sample of a material whose absorption spectra of transient chemical species are to be examined upon which the ultraviolet beam is impressed to excite the sample and create the desired species. At the same time, the red beam is focused upon a selected second sample with intensity sufficient to create a very high energy, broadband background continuum spark of nanosecond, or less, duration. Spectral and/or time resolved spectral observation apparatus are provided for obtaining, on a single experiment basis, the desired display of the excited transient species. The reader is referred to the complete specification for an understanding of the structural and conceptual details.

BACKGROUND OF THE INVENTION

(1) Field of the invention

The invention relates generally to photolysis and spectroscopy and more particularly to novel apparatus for the observation and study of $10^{-9}$ to $10^{-12}$ second transient phenomena.

Although the present invention finds particularly advantageous utilization in the field of photolysis and spectroscopic analysis of transient chemical species of extremely short lifetimes, and although in the cause of clarity and brevity of presentation such of the following discussion and description of examples of the invention relate particularly thereto, it is expressly to be understood that the advantages of the invention are equally well manifest in other fields wherein analysis or synthesis and its observation are achievable by utilization of spatially and spectrally separable but temporally synchronized high energy, short pulses of light beam energy.

(2) Discussion of the prior art

In photochemistry, progress toward better understanding of existing materials and discovery and development of new materials has always been made by advances in the nature of obtaining new and useful information by making observations on an ever shorter time scale. For example, during the most recent decades the study of excited states and free radical intermediates of short life has contributed greatly to the understanding of the detailed mechanisms of chemical reactions. One of the most powerful tools in such investigations has been the flash photolysis technique. With the aid of this technique it has been possible to generate photochemically, and study spectroscopically a wide variety of free radicals and excited molecules in gaseous, liquid and solid systems. Using short duration ($10^{-6}$ to $10^{-3}$ sec.) discharges in rare-gas-filled flash lamps as photochemical sources, concentrations of transient intermediates sufficient for observation and study by absorption spectroscopy can be obtained.

Two variations of the flash photolysis technique have been developed, viz, flash spectroscopy and kenetic spectrophotometry. In the former, a second flash with a variable time delay provides a spectroscopic continuum against which to record the absorption spectra of the transient intermediates produced by the first flash. A photographic record of the spectrum over a wide spectral range is obtained with the aid of a spectrograph. In the latter, a kinetic spectrophotometry, the second flash is replaced by an intense continuous background source such as a xenon arc, and observations are made at a single wavelength using a monochromator, photomultiplier, and oscilloscope. Spectrographic recording is advantageously suited for exploratory work where there is no foreknowledge of the spectral region in which new absorption bands may appear. Once the wavelengths of new absorption bands are known, the photomultiplier technique is generally preferable for detailed kinetic studies because it is more accurate and gives a complete time history in a single experiment. For exploratory work, however, kinetic spectrophotometry suffers serious limitations with respect to flash spectroscopy because a large number of experiments are needed to cover a useful spectral range.

It has been recognized in the prior art that extending flash photolysis techniques into the nanosecond region would be highly useful. Excited singlet states of organic molecules and singlet excitors in molecular crystals have lifetimes in the nanosecond range. The triplet states of aromatic ketones, such as benzophenone, have lifetimes shorter than $10^{-6}$ second. The chemistry of the solvated electron following pulse radiolysis has been widely considered recently on the nanosecond time scale. Complementary photolytic studies and the availability of a wide spectral range of observation therewith have been sought. However, there has not heretofore been provided a photolysis system capable of achieving desirably effective observations in the nanosecond range.

The extension of kinetic spectrophotometry to the nanosecond has also presented many difficulties, for example: deleterious shot noise increases with the frequency bandwidth of the detection system; photomultiplier cathodes are liable to overloading and damage at high light intensities; and sophisticated electronic circuitry is usually required for reproducible triggering and synchronization. A basic problem has been that of providing a photon flux at the detector high enough to overcome noise arising from statistical fluctuations. Several approaches have been explored. Opening up the slits of the monochromator or utilizing an instrument of lower dispersion or using a set of filters was each recognized as means for bringing more light to the detector, but in the process spectral resolution was sacrificed. A background light source of higher intensity has been attempted, but the detector is vulnerable to serious damage from the overload.

It is known in the prior art that it is also possible to improve the signal-to-noise ratio by averaging the signal over several hundred, or even several thousand experiments. For example, for optical studies of the hydrated electron employed a rotating sector to reduce the average light intensity from a 450 watt xenon lamp falling on a 1P28 photomultiplier. Using a sampling oscilloscope, about 1000 pulses were required to obtain a complete decay curve with 2.5 nsec. time resolution and a signal-to-noise ratio of 20. A photometric technique with $10^{-8}$ sec. time resolution, but which similarly employs 1000 giant laser pulses and signal-averaging to obtain a signal-to-noise ratio of only 4, has been recently described.

Although repetitive techniques are at least marginally useful for kinetic studies at a single wavelength of a previously identified species, they are formidably tedious for an exploratory study of a new species system, where it would be necessary to carry out a thousand experiments at each of many wavelengths to cover a useful region of the spectrum. Repetitive techniques are also obviously severely limited for systems which exhibit photodecomposition.

Accordingly, it is an object of the present invention to provide improved photolysis and spectroscopic apparatus and method which is not subject to these and other disadvantages and limitiations of the prior art.

It is another object to provide such a system and method which provide capability for broad spectral observation and analysis of chemical species having transient spans of interest of the order of nanoseconds or less in length.

It is another object to provide such aparatus which presents complete temporal spectrum history of such species with at least nanosecond temporal resolution in a single experiment.

It is another object to provide such apparatus in which the spectral and temporal resolution may be compressed or expanded in wide ranges of adjustment.

It is another object to provide such a system in which temporal synchronization between background continuum and the excitation of the transient species to be observed is achievable without the requirement of complex electronics circuitry.

SUMMARY OF INVENTION

Very briefly, these and other objects are achieved in accordance with the structural concepts of one example of the invention which comprises a short pulse laser the output beam of which is directed along a predetermined axial path. An optic frequency doubler is interposed in the path whereby a portion of the laser beam pulse is converted to a much higher frequency range e.g. ultraviolet while the remainder of the pulse remains at the lower, non-doubled frequency e.g. in the visible or infrared range.

A dispersion or polarizing element is then interposed in the path of the composite beam for spatially separating the pulse into its two wavelength components. Means are provided for impressing the higher frequency component upon a sample to be excited and observed while the lower frequency portion is focused upon a medium to provide a laser induced, high energy breakdown spark. The latter provides a spectrally broad background synchronized with the excited states in the sample, and means are provided for spectrally observing or recording the transient species as illuminated by the background continuum. "Static" spectral observation means or time resolving kinetic recording means are provided in optical coupling with the illuminated sample.

Further details of these and other novel features and their principles of operation as well as additional objects and advantages of the invention will become apparent and be best understood from a consideration of the following description when taken in connection with the accompanying drawing which is presented by way of illustrative example only.

BRIEF DESCRIPTION OF DRAWING

The drawing is an optic schematic diagram of an example of a laser photolysis and spectroscopy system constructed in accordance with the structural principles and certain conceptual aspects of the invention.

DETAILED DESCRIPTION OF A PREFERRED EMBODIMENT

With specific reference now to the figure in detail, it is stressed that the particulars shown are by way of example and for purposes of illustrative discussion only and are presented in the cause of providing what is believed to be, in a concise form, the most useful and readily understood description of the principles and structural concepts of the invention. In this regard no attempt is made to show structural details of the apparatus in more detail than is necessary for a fundamental understanding of the invention. The description taken with the drawing will make it apparent to those skilled in the laser and spectroscopy arts how the several forms of the invention may be embodied in practice.

Specifically, the detailed showing is not to be taken as a limitation upon the scope of the invention which is defined by the appended claims forming, along with the drawing, a part of this specification.

In the drawing the particular example of the laser photolysis system illustrated includes a Q-switched ruby laser 10 which, for this case, is selected and designed to provide a 694 nanometer (nm.) wavelength pulse of a few tens of nanoseconds duration, or picoseconds when mode-locked, with a total energy content of the order of a few joules. This output is directed in a beam 12 along an axial path, as shown, which may include a ruby laser amplifier for increasing the pulse energy to the order of ten joules when desired for particular experiments or observations. The laser 10, whether a single active unit or such a combination, is controlled and provided with appropriate power parameters from a control network 14 the substantially monochromatic pulse energy in the beam 12 is impressed upon a harmonic generator 16 for purposes of providing an excitation beam having a photon quanta of higher energy and frequency. The generator may be a non-linear crystal of potassium dihydrogen phophate (KDP) which provides a frequency doubling of a small percentage of the transmitted beam whereby the doubler output beam 18 includes a spectrally separated temporally and spatially synchronized pair of beam components, one at 694 nm., and the other at the first harmonic thereof viz 347 nm.

A dispersion element is interposed in the path of the composite beam 18 and in this example is a thin-walled quartz prism 20 filled with a fluid substance, to avoid photodecomposition, of appropriate index of refraction to achieve a useful spatial divergence of the two output beam components 22, 24. These may be considered as a spark generating reaction beam and a species excitation reaction beam, respectively. The former reaction beam 22 is focused by a lens device 26 to a point 28 within, in this example, an oxygen filled quartz cell 30. The resultant field strength causes a discharge breakdown and provides an intense broadband continuum spark which serves as an absorption illumination for observation of the excited sample at 32.

Observation of the background continuum as affected by absorption in the sample 32 is achieved by impressing the light output 34 from the sample upon a spectrograph 36. Alternatively, or additionally, the light output may be spectrally spread over the photocathode of an image converter camera 38. The electron emission therefrom is then deflected in a lateral direction transverse to the spectral spreading to provide a time resolved history of the photospectrum on the cathode. With available such image converters, any portion of the incident spectrum may be expanded and readily time resolved to the order of picoseconds.

It has thus been made possible, herewith, to observe and record the spectral absorption of transient species in the nanosecond and picosecond time range.

It may be noted that the duration of the light pulse from the breakdown spark may be widely controlled by the selection of the gas used in the container cell 30, for example, in xenon it exceeds 1 microsecond, in argon it is approximately 200 nanoseconds, while in pure oxygen it is approximately 30 nanoseconds.

In a typical utilization of a practical embodiment of the invention, the excited singlet state of the aromatic compound coronene was observed and clearly distinguished from the triplet-triplet absorption. In similar studies, new absorption bands were also found for 1,12-benzperylene, 1,2 - benzanthracene, and 1,2:3,4 - dibenzanthracene. It may be noted that it appears that excited singlet state absorption is a general phenomenon for aromatic molecules.

There have thus been disclosed and described a number of structural aspects of an example of a novel laser photolysis and spectroscopy system which is faster by orders of magnitude than prior art instrumentation and which exhibits wide application to solid, liquid, and gaseous systems in searching for intermediate states of very short lifetimes and increasing the understanding of photochemical primary processes.

We claim:
1. Photolysis and spectroscopy system comprising:
   pulse laser means of the character to provide high energy substantially monochromatic electromagnetic pulse energy of a predetermined wavelength directed along a selected beam path,
   optic harmonic means interposed in said path for generating at least one harmonic light signal synchronized with said pulse energy and providing at least a first and second harmonically longer and shorter wavelength, respectively, related output beams,
   beam separation means optically coupled to said harmonic means for spatially separating said first and second beams along respective first and second reaction paths,
   beam focusing means interposed in said first reaction path for focusing said first, longer wavelength, output beam at a predetermined reaction point,
   photo-induced spark means disposed to include said reaction point for producing a spectrally broad, temporally short absorption continuum for illuminating a photo-excited sample, and
   sample means interposed optically in said second reaction path for receiving said second output beam in photo excitation, transient species producing relation with respect to a chemical sample disposed thereat and in a manner to receive said illuminating absorption continuum.
2. The invention according to claim 1 which further includes spectrally analytic means optically coupled to said sample means in a manner to receive said continuum as affected by absorption by said chemical sample.
3. The invention according to claim 2 in which said spectrally analytic means includes spectroscope apparatus for observing said sample affected continuum on a spectrally dispersed presentation.
4. The invention according to claim 2 in which said spectrally analytic means includes means for providing a temporally independent presentation of said sample affected absorption continuum and presentation means for temporally spreading the otherwise temporally independent said spectral presentation in a sense transverse thereto.
5. The invention according to claim 4 in which said spectrally analytic means comprises image converter camera recorder means.
6. The invention according to claim 2 in which said laser means is of the character to provide high energy pulses having lengths in the order of nanoseconds.
7. The invention according to claim 6 in which said laser means comprises a Q-switched ruby laser providing pulses at red wavelengths.
8. The invention according to claim 6 in which said optic harmonic means includes a KDP element for doubling the frequency of a portion of said pulse energy directed along said selected beam path.
9. The invention according to claim 1 in which said laser means includes a mode-locking laser of the character to provide said output pulses of length in the order of picoseconds.
10. The invention according to claim 1 in which said beam separation means includes prismatic means filled with fluid state substance to provide the desired dispersion of said first and second beams.

References Cited
UNITED STATES PATENTS 3,354,315   11/1967   Preston et al. _____ 356—76

OTHER REFERENCES

Spaeth et al.: "Fluorescence and Bleaching of Organic Dyes for a Passive Q-Switch Laser," The Journal of Chemical Physics, vol. 48, No. 5, Mar. 1, 1968, pp. 2315–2323.

Tiffany: "Selective Photochemistry of Bromine Using a Ruby Laser," The Journal of Chemical Physics, vol. 48, No. 7, Apr. 1, 1968, pp. 3019–3031.

RONALD L. WIBERT, Primary Examiner

F. L. EVANS, Assistant Examiner

U.S. Cl. X.R.

23—253; 356—76